Feb. 14, 1928.

A. Y. DODGE 1,659,087

VEHICLE BRAKING SYSTEM

Filed June 1, 1925

INVENTOR
ADIEL Y. DODGE
BY
ATTORNEY

Patented Feb. 14, 1928.

1,659,087

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

VEHICLE BRAKING SYSTEM.

Application filed June 1, 1925. Serial No. 34,145.

This invention relates to braking systems for automobiles and other vehicles, and has for one object the provision of a connector between two sets of brakes to permit simultaneous operation of both sets, and which is readily adjustable or removable to permit independent operation of the two sets to comply with the laws of certain states. Preferably it has an over-running connection with one set, shown as the rear set, to permit an arrangement in which the emergency brake lever never operates more than one set.

The above and other objects and features of the invention, including various novel combinations of parts and desirable particular constructions, will be apparent from the following description of the illustrative embodiments shown in the accompanying drawings, in which.

Figure 1:
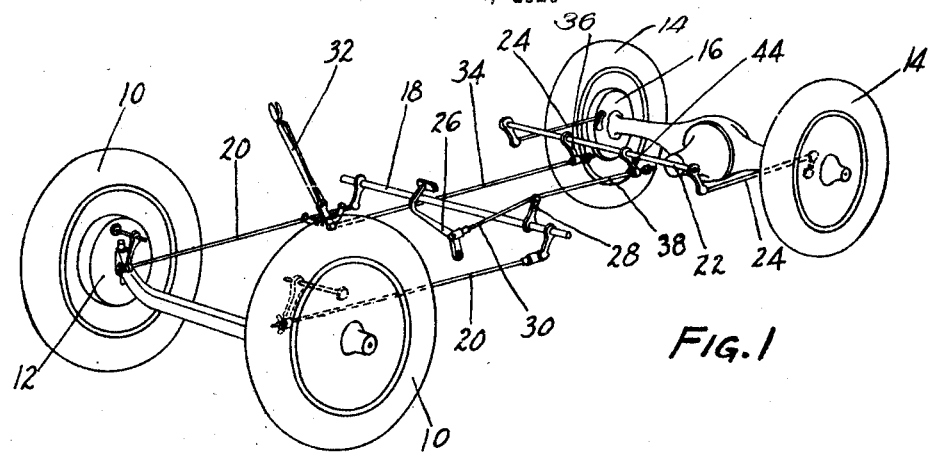
Figure 1 is a perspective view of the principal parts of a chassis embodying the invention.

The chassis shown in Figure 1 includes front wheels 10 having a set of brakes 12 and rear wheels 14 having a set of brakes 16. Brakes 12 are shown operated from a rockshaft 18 by links 20, and brakes 16 are operated (through a suitable equalizer if desired) from a rockshaft 22 by links 24.

A controlling member, such as a service pedal 26, is connected to an arm 28 on shaft 18 by a link 30, while an emergency lever or the equivalent 32 has a link 34 projecting through an opening in the end of an arm 36 on shaft 22, and provided with suitable locknuts or the like, forming an over-running connection.

Figure 2:
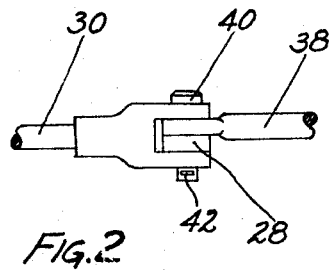
Figure 2 is a detail view of a readily-detachable connection for one end of a link serving as the described connector.

In the form of the invention shown in detail in Figure 2, link 30 is forked at its end to embrace the upper end of arm 28, and one end of a link or other connector 38, the parts being joined by a pin 40 held if desired by a cotter pin 42, or in any other suitable manner. The rear end of link 38 projects through a sleeve on an arm 44 on shaft 22, and is threaded to receive locknuts 46, or other means forming an overrunning connection.

By the above-described arrangement, ordinarily depression of pedal 26 will apply all the brakes, without disturbing lever 32, while lever 32 will apply only the rear brakes without disturbing pedal 26. But in a state requiring two entirely separate sets of brakes, link 38 may be removed, so that the pedal operates the front brakes only and the lever operates the rear brakes only.

Suitable washers or the like may be inserted to prevent rattle of the connection between link 30 and arm 28 when link 38 is removed.

Figure 3:
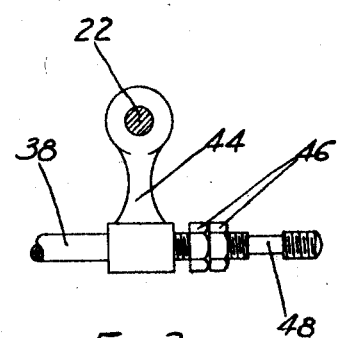
Figure 3 is a detail showing an adjustable over-running connection for use when it is not desired actually to remove the link.
Figure 4:
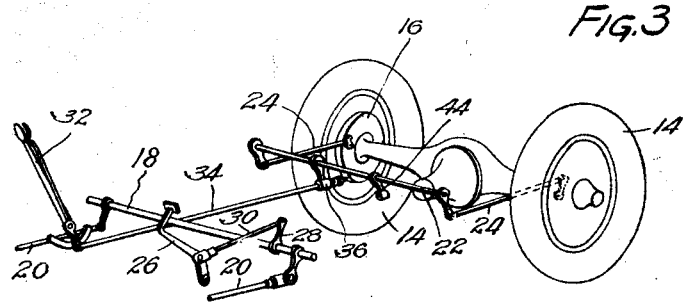
Fig. 4 is a fragmentary perspective of a chassis showing link 38 removed.

If preferred, instead of removing the link 38 entirely, the threaded part of its rear end may be made long enough (Figure 3) so that nuts 46 may be backed off to a position where link 38 is inoperative to rock shaft 22, even though not actually removed. A portion 48 of the threaded part may be turned down to a smaller diameter, to facilitate backing the nuts off.

While illustrative embodiments have been described in detail, it is not my intention to limit the scope of the invention to those particular embodiments, or otherwise than by the terms of the appended claims.

I claim:

1. A vehicle having, in combination, retarding means acting on the front wheels, retarding means acting on the rear wheels, a service member operatively connected to the first retarding means and operatively connected with the second retarding means through a connector operated by the service member and having an over-running connection with the second retarding means and readily detachable from operative engagement therewith, and an emergency member having an over-running connection to the second retarding means.

2. A vehicle having, in combination, front brakes, rear brakes, a rockshaft connected to the front brakes, a different rockshaft connected to the rear brakes, a separate member for rocking each shaft, and a readily-removable connector operated by one rockshaft and having an over-running connection with the other to permit simultaneous operation of all the brakes.

3. A vehicle having, in combination, front brakes, rear brakes, a rockshaft connected to the front brakes, a different rockshaft connected to the rear brakes, means for rocking both shafts, and a connector operated by one rockshaft and having an over-running connection with the other to permit simultaneous operation of all the brakes, the over-running connection being readily adjustable to an inoperative condition.

In testimony whereof I have hereunto signed my name.

ADIEL Y. DODGE.